July 23, 1968  L. R. POTTER ET AL  3,393,467
CASTING SINKER
Filed Oct. 18, 1965
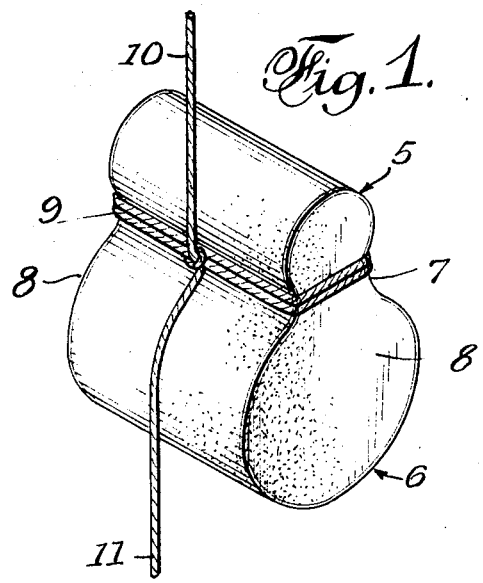
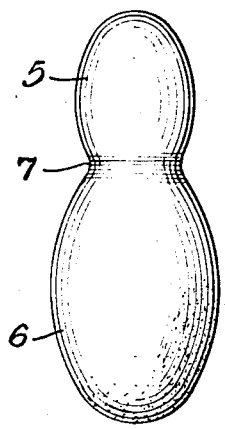
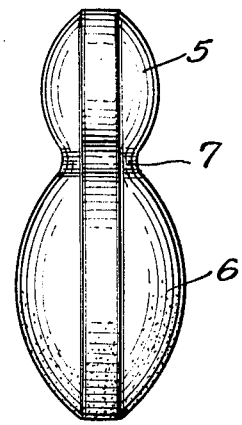
LEE ROY POTTER
ALBERT L. POTTER
LELAND E. POTTER
WALTER H. OLIVER
INVENTORS
BY C. G. Stratton
ATTORNEY United States Patent Office 3,393,467
Patented July 23, 1968

3,393,467
CASTING SINKER
Lee R. Potter, 1138 West Ave., J–12, Lancaster, Calif. 93534; Albert L. Potter, P.O. Box 61, Sierraville, Calif. 96126; Leland E. Potter, 1127 West Ave., J–12, Lancaster, Calif. 93534; and Walter H. Oliver, 1665 Grand View Ave., Reno, Nev. 89503
Filed Oct. 18, 1965, Ser. No. 497,263
3 Claims. (Cl. 43—43.12)

ABSTRACT OF THE DISCLOSURE

A casting sinker comprising an integral member of appropriate weight having a water soluble binder and constructed with a large end portion and a small end portion with a small connecting neck whereby dissolution of the small end portion will permit a fishing line wrapped around the neck to escape to free the hook.

This invention relates to a casting sinker and has for an object to provide a sinker that, after a baited fishing line has been cast, disintegrates to free the line of the sinker.

A sinker, according to its weight, will pull a line down in the water and prevent fishing at or near the surface. However, unless a sinker is attached to the line, the cast cannot have the accuracy nor the distance that is desired. Sinkers that break away or become detached from the line upon striking the water are known. Such sinkers and others of varying design are time-consuming in that they require careful and fussy attachment, threading of the line or leader through one or more holes provided in the sinker and, generally, requiring great care to attach to insure that the sinker may not become loose during the cast and possibly cause injury to other fishermen.

Another object of the invention is to provide a quick release, easily attachable sinker that eliminates the above enumerated faults of prior devices and which, by disintegrating due to contact with the water, quickly, and without snarling, frees the line.

Another object of the invention is to provide a casting sinker, as above characterized, that is formed to provide a neck for simple and rapid application of a tightening loop of the fishing line and which, when snugged up, affords casting of the bait on the end of the line to the distance desired and with effective accuracy. Upon disintegration, even if only partial, the loop will become loosened during the time the sinker is taking line and tackle to the bottom. The line, upon being thus freed, is not subject to snag-ups on the retrieve action, which is frequently the case with metal or similar hard material sinkers.

A further object of the invention is to provide a sinker that is soluble in water and which, while of solid consistency, when dry, is quite unlikely to injure a person accidentally struck thereby.

This invention also has for its objects to provide such means that are positive in operation, convenient in use, easily installed in a working position and easily disconnected therefrom, economical of manufacture, relatively simple, and of general superiority and serviceability.

The above objects are realized in a casting sinker that is molded of soil, sand and clay bonded together by a water soluble adhesive binder or paste made of starch, preferably cornstarch. The sinker is provided with a neck between two bulbous ends of which one is preferably smaller than the other. One or two turns of a fish line to form a tightening loop around said neck, when snugged up, enables the sinker to be cast out. Upon striking the water and as the same sinks toward the bottom, the adhesive binder becomes dissolved, causing disintegration of the sinker. When the smaller of the two bulbous ends of the sinker has become sufficiently reduced in size, retrieving action on the fishing line will effect final separation of the sinker from the line.

The invention also comprises novel details of construction and novel combinations and arrangements of parts, which will more fully appear in the course of the following description and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a perspective view of a preferred form of sinker according to the present invention, shown with a fishing line looped therearound so the sinker may be cast to carry the tackle on the end of the line to a point distant from the fisherman.

FIGS. 2 and 3 are side elevational views of modifications.

The casting sinker that is illustrated comprises a molded body having two ends 5 and 6, connected by a neck 7. Whether formed with flat side faces 8, as in FIG. 1, or being of continuously rounded form in transverse cross-section, as in FIG. 2, or having a shape formed by joining two pellets, as in FIG. 3, the end 5 is preferably smaller than the other end 6.

The casting sinker that is illustrated comprises a molded body having two ends 5 and 6, connected by a neck 7. Whether formed with flat side faces 8, as in FIG. 1, or being of continuously rounded form in transverse cross-section, as in FIG. 2, or having a shape formed by joining two pellets, as in FIG. 3, the end 5 is preferably smaller than the other end 6.

The loop 9, in the line 10, may be formed in any manner suitable to the purpose of providing a tightly snugged-up connection that holds the sinker captive to the line 10 during cast.

While the sinker may be made in various sizes and weights, according to the tackle on the end 11 of the line 10, an exemplary form for light tackle need only weigh about one-half ounce. Such a sinker, in the form of FIG. 1, will have an over-all length of 1⅛" along a face 8, and a thickness of ¾" between faces.

The above quick-release casting sinker is advantageously molded of the following ingredients, by volume:

One part loam soil
One-half part fine sand
One-quarter part clay
One-sixth part soluble binder.

The loam soil may be broadly considered as common earth; the fineness of the sand is not critical, provided the same has good dispersion through the loam soil and clay; the clay includes adobe as one type, and may be generally described as clay soil; and the soluble binder may comprise a paste or adhesive made of starch, preferably cornstarch.

With the binder in suitable paste or liquefied form, the above ingredients, after being intermixed, are compacted in a mold. Upon evaporation of the moisture in the starch, the molded article forms a dry, solid mass that is sufficiently resistant to crumbling, much like the resistance of bricks, especially of adobe. The mass is porous and, when immersed in water, the binder dissolves, causing the soil, sand and clay ingredients to disintegrate, releasing the loop 7, as above explained. It will be clear that upon the smaller end 5 reducing to at least the size of the neck, the sinker and line will become separated, since said reduced end will be freed of the loop.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. A quick-release casting sinker for a fishing line comprising a molded elongated body of disintegratable material bonded by a water-soluble binder, said body comprising:
   (a) a smaller elongated end portion,
   (b) a larger elongated end portion, and
   (c) a reduced neck portion formed integral with and connecting said end portions and adapted to be encircled and substantially covered by a loop portion formed in a fishing line,
   (d) said loop portion supporting said body on said line,
   (e) said loop portion floating free from said neck portion when, after the binder has been dissolved, the smaller end portion disintegrates to a size at least as small as the neck portion.

2. The casting sinker according to claim 1 in which the elongated body is of continuously rounded form in cross-section with its ends flat and connected to the side walls by relatively sharp edged portions.

3. A casting sinker according to claim 1 in which the member is provided with two bulbous ends, and a neck connecting said ends, a loop in a fishing line being adapted to hold the sinker captive by the neck to the line during casting, and, upon at least part disintegration of the member when immersed in water after the cast to dissolve the binder, said loop being adapted to float free of the partly disintegrated member.

References Cited
UNITED STATES PATENTS

| | | | |
|---|---|---|---|
| 2,308,238 | 1/1943 | Baker | 43—43.12 |
| 3,280,498 | 10/1966 | Decker | 43—43.12 |

FOREIGN PATENTS 1,054,574  10/1953  France.

OTHER REFERENCES

Popular Mechanics, J. B. Stephens article, June 1962, p. 166.

SAMUEL KOREN, *Primary Examiner.*

J. H. CZERWONKY, *Assistant Examiner.*